UNITED STATES PATENT OFFICE.

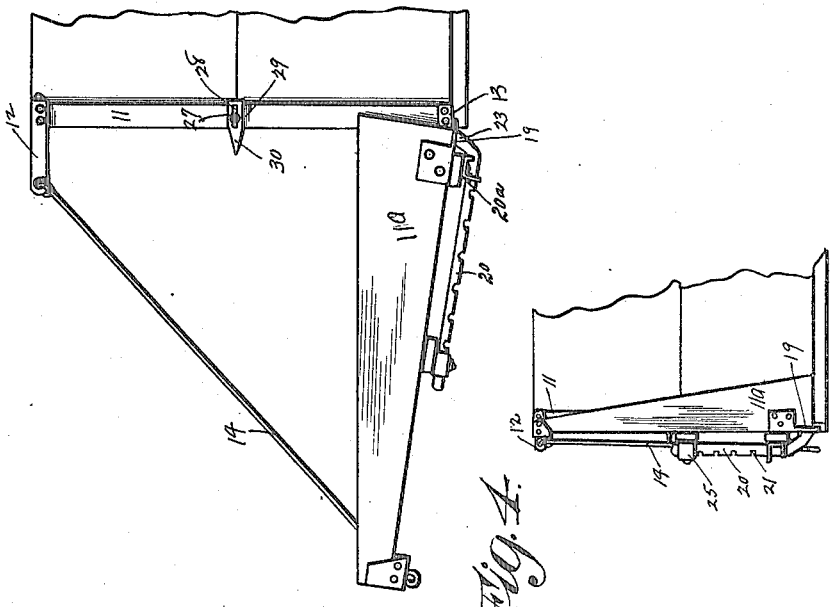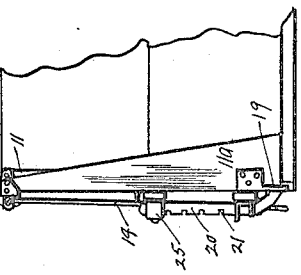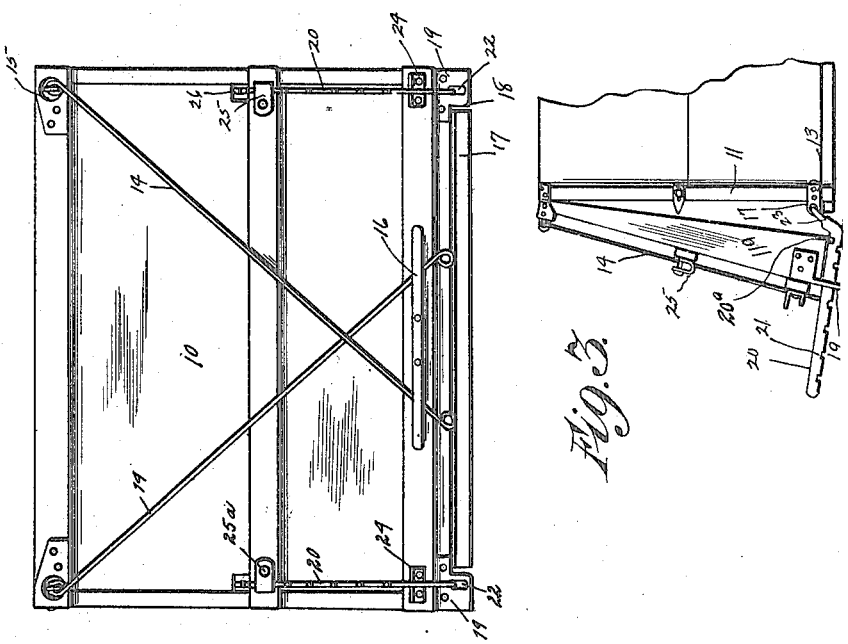

PHILIP J. LAWTON, OF JAMAICA, IOWA.

COMBINED GRAIN-DUMP AND SHOVELING-BOARD.

1,207,182.  Specification of Letters Patent.  Patented Dec. 5, 1916.

Application filed November 26, 1915. Serial No. 63,520.

*To all whom it may concern:*

Be it known that I, PHILIP J. LAWTON, a citizen of the United States, and resident of Jamaica, in the county of Guthrie and State of Iowa, have invented a certain new and useful Combined Grain-Dump and Shoveling-Board, of which the following is a specification.

The object of my invention is to provide a combined grain dump and shoveling board, of comparatively simple, durable and inexpensive construction, adapted to be mounted on the rear end of any ordinary wagon box.

A further object is to provide such a device capable of being used as an end gate, and by very slight adjustment capable of being moved to position for use as a shoveling board, and also capable of being moved outwardly at its lower end to permit grain to pass out of the lower rearward part of the wagon box to an elevator or the like.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a rear elevation of my improved combined grain dump and shoveling board in its closed position. Fig. 2 shows a side elevation of the rear end of a wagon box with my device installed thereon, in its position used as a shoveling board. Fig. 3 shows a view similar to that shown in Fig. 2, with the parts in position for use as a grain dump, and Fig. 4 shows a side elevation of the rear end of the wagon bed with my improved grain dump and shoveling board installed thereon.

In the accompanying drawings, I have used the reference numeral 10 to indicate generally the body of my grain dump and shoveling board adapted when in its closed position to form an end gate. The body 10, which I shall call the end gate member, has the wings 11ª, adapted to overlap the outside of the wagon bed. The end gate member is mounted on the wagon bed in the following manner: On the outside of the rear ends of the sides of the wagon bed are secured upright strips 11 in any suitable manner. Secured to the strips 11 at their upper ends and extending rearwardly therefrom are bars 12. Secured to the strips 11 at the lower ends thereof are rearwardly extending bars 13. Pivoted to the outer ends of the bars 12 are rods 14 extended through suitable openings 15 in the upper portions of the end gate member 10. The rods 14 are of sufficient length to extend to the lower end of the end gate member in position overlapping each other with their ends received beneath a spring clip device 16, as clearly shown in Fig. 1.

The bottom 17 of the wagon bed extends rearwardly and slightly beyond the upright strips 11, as shown in Fig. 3 either integrally or by adding a strip so that the lower edge of the end gate member 10 rests upon said projecting end of the bottom when the end gate is in its closed position. Portions of the bottom 17 are cut away at the corners at 18, as shown in Fig. 1.

Secured to the lower part of the end gate member 10, at the corners thereof, are plates 19, having portions which extend downwardly below the end gate member 10, and are received in the notches 18 when the end gate member is closed, and extend forwardly beneath the wagon bed when the end gate member is in its lower position, for use as a shoveling board.

For securing the lower end of the end gate member to the wagon bed, bars 20 are provided having in their rear edges a plurality of notches 21. The bars 20 are extended through slots 22 in the plates 19.

At their lower ends, the bars 21 are provided with extensions 23 inclined at an angle preferably slightly greater than a right angle, to the bodies of the bars 20 and pivoted to the respective plates 13. It will thus be seen that when the end gate member 10 is in its raised position, as shown in Figs. 1 and 4, the extensions 23 of the bars 20 are received in the slots 22 and the bars 20 extend in upright position.

Mounted on the lower rear surface of the end gate member 10 near each end thereof is an angle iron 24, having horizontal flanges in which are slots to receive the bars 20, when the end gate is in its closed position. By means of the angle bars 20 the end gate is held against lateral movement. The bars 20 have slots 20ª to engage said flanges to prevent movement of the end gate longitudinally of the bars 20.

For locking the upper ends of the bars 20 against the end gate member 10, there are provided U-shaped yokes 25, adjustably pivoted to the end gate member by bolts 25ª and adapted to swing over and inclose the upper ends of the bars 20, as shown in Fig. 1. The yokes 25 may be swung upwardly to clear the upper ends of the bars 20 for releasing said bars.

In the end gate member 10, near each side of the wagon box and approximately at the horizontal center of the end gate member 10, are openings 26. Mounted on the upright members 11 are adjusting members 27, having horizontally elongated slots 28 in which are received adjusting bolts 29, which are extended through the members 11. It will thus be seen that the members 27 may be adjusted fore-and-aft of the wagon.

The lower edges of the adjusting members 27 at their rearward portions are beveled at 30, as shown in Fig. 2. It will be seen that by adjusting the members 27 fore-and-aft in the wagon, they may engage the portion of the end gate member 10 at the lower parts of the slots 26 for holding the end gate member against the wagon bed bottom 17, and if the parts should become loosened, it is possible to move the members 27 rearwardly, and thereby keep the end gate member tightly forced against the wagon bed.

In the practical use of my improved grain dump and shoveling board, the parts are assembled and installed on the wagon bed as hereinbefore described.

When the device is used as an end gate, the end gate member 10 is left in its upright position, with the bars 20 locked in the notches in the flanges of the angle irons 24, with the upper ends of the bars 20 held by the yokes 25. It will be seen that on account of the peculiar shape of the bars 20 and the extensions thereon, the lower part of the end gate will be held firmly against the ends of the wagon bed. On account of the fact that the plates 19 project downwardly into the notches 18, no lateral movement of the end gate is permitted with relation to the bottom of the wagon bed. The side wings also prevent any lateral movement of the end gate. The members 27 prevent any upward movement of the end gate and hold the end gate firmly against the bottom of the bed.

When it is desired to use the device as a shoveling board, the members 14 are released from the spring clips 16 and swung outwardly and downwardly to the position shown in Fig. 2, where the loops of the lower ends of the members 14, which are too large to pass through the openings 15, will engage the end gate member and hold it in position for use as a shoveling board. It will be seen that by the construction of the bars 20, the yokes 25, the angle irons 24, the plates 19, and the members 13, a very strong connecting means is provided for pivotally securing the end gate member to the wagon bed when the device is so used as a shoveling board. It will be seen that when the device is in position for use as a shoveling board, the plates 19 engage the bottom
17 and prevent lateral movement of the end gate member 10.

When it is desired to use the device as a grain dump, and assuming that it is in its closed position, the yokes 25 are moved to release the upper ends of the bars 20, which bars 20 are then swung rearwardly and downwardly, whereupon the lower part of the end gate member may be swung rearwardly as may be desired, and can be locked in a variety of positions by means of the notches 21, and the bars 20 which may be engaged with the plates 19. In this way the device when used as a dump may be adjusted for discharging small grain, shell corn, ear corn or the like.

It will be understood that some changes may be made in the construction and arrangement of the parts of my improved device without departing from its essential features and purposes, and it is my intention to cover by this application any such changes which may be included within the scope of my claims.

I claim as my invention:

1. In an end gate member means for securing said end gate member at its upper end to a wagon bed, means for adjustably securing said end gate member at its lower end to a wagon bed, said last named means comprising notched bars on the outside of said end gate member, having portions at their lower ends extending inwardly and to the wagon bed and designed to be pivoted thereto, means for locking the upper ends of said bars to the end gate member, said end gate member having slotted members through which said bars are extended.

2. In a device of the class described, an end gate member, means for pivotally securing said end gate member at its upper end to a wagon bed, means for adjustably securing said end gate member at its lower end to a wagon bed, said last named means comprising bars having portions at their lower ends extending away from the bodies of said bars at angles with relation thereto, said extensions being designed to be pivotally supported with relation to the wagon bed, said bars having a plurality of notches, plates on the lower end of said end gate member, said bars being extended through the respective plates, and adapted to slide therein, means for locking the upper ends of said bars to the end gate member.

3. In a device of the class described, an end gate member, plates at the lower corners of said end gate member extending below the body thereof, having openings, members adapted to be secured to a wagon bed and to extend through said openings, comprising bars having angular extensions at their lower ends designed to be secured to the wagon bed, said bars having notches in their rear edges to coact with said plates, lock devices on the end gate member for securing the upper ends of the bars to the end gate member when the end gate member is in closed position, guide devices on said end gate member for receiving the said last described bars near their lower ends, and means for securing the upper end of said end gate member to the wagon bed.

Des Moines, Iowa, November 10, 1915.

PHILIP J. LAWTON.

Copies of this patent may be obtained for five cents each, by addressing the "Commissioner of Patents, Washington, D. C."